(12) United States Patent
Huang et al.

(10) Patent No.: US 12,091,251 B2
(45) Date of Patent: Sep. 17, 2024

(54) STORAGE SYSTEM

(71) Applicant: BEIJING JINGDONG QIANSHI TECHNOLOGY CO., LTD., Beijing (CN)

(72) Inventors: Fengquan Huang, Beijing (CN); Guoku Song, Beijing (CN); Chen Liu, Beijing (CN); Mingfu Wu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 305 days.

(21) Appl. No.: 17/636,066

(22) PCT Filed: Apr. 22, 2020

(86) PCT No.: PCT/CN2020/086000
§ 371 (c)(1),
(2) Date: Feb. 17, 2022

(87) PCT Pub. No.: WO2021/051806
PCT Pub. Date: Mar. 25, 2021

(65) Prior Publication Data
US 2022/0281683 A1 Sep. 8, 2022

(30) Foreign Application Priority Data
Sep. 19, 2019 (CN) .......................... 201910886446.1

(51) Int. Cl.
B65G 1/04 (2006.01)
B65G 1/06 (2006.01)

(52) U.S. Cl.
CPC ............. B65G 1/06 (2013.01); B65G 1/0492 (2013.01)

(58) Field of Classification Search
CPC ............................... B65G 1/0492; B65G 1/06
See application file for complete search history.

(56) References Cited

U.S. PATENT DOCUMENTS 3,779,403 A 12/1973 Young
10,294,026 B1 5/2019 Lee et al.
(Continued)

FOREIGN PATENT DOCUMENTS

CN 204507902 U 7/2015
CN 204713851 U 10/2015
(Continued)

OTHER PUBLICATIONS

"Communication with Supplementary European Search Report", EP Application No. 20866577.8, Jul. 20, 2023, 9 pp.
(Continued)

*Primary Examiner* — Saul Rodriguez
*Assistant Examiner* — Willie W Berry, Jr.
(74) *Attorney, Agent, or Firm* — Myers Bigel, P.A.

(57) ABSTRACT

A storage system includes: a storage device including a shelf, wherein the shelf includes at least two layers of article platforms; an article transport device, configured to access the articles on the article platforms; and a lifting drive mechanism disposed on the storage device and configured to have a power connection state with the article transport device to drive the article transport device to lift up or down along the shelf in the power connection state.

17 Claims, 6 Drawing Sheets

(56) References Cited

U.S. PATENT DOCUMENTS

| | | | |
|---|---|---|---|
| 11,223,014 B2 | 1/2022 | Song et al. | |
| 2003/0185657 A1 | 10/2003 | Stefani | |
| 2012/0027546 A1 | 2/2012 | Zombori | |
| 2015/0158670 A1* | 6/2015 | Kainuma | B66B 7/047 414/277 |
| 2016/0152446 A1 | 6/2016 | Dudde et al. | |
| 2018/0305126 A1 | 10/2018 | Moulin et al. | |
| 2019/0308812 A1* | 10/2019 | Lindblom | B65G 1/1375 |
| 2019/0375588 A1* | 12/2019 | Lindbo | B65G 1/0464 |
| 2021/0047111 A1 | 2/2021 | Lindbo et al. | |

FOREIGN PATENT DOCUMENTS

| | | |
|---|---|---|
| CN | 105438707 A | 3/2016 |
| CN | 105775547 A | 7/2016 |
| CN | 205471042 U | 8/2016 |
| CN | 106829299 A | 6/2017 |
| CN | 108438705 A | 8/2018 |
| CN | 108726064 A | 11/2018 |
| CN | 109533752 A | 3/2019 |
| CN | 110035961 A | 7/2019 |
| CN | 110116878 A | 8/2019 |
| CN | 210122322 U | 3/2020 |
| JP | H06042810 U | 6/1994 |
| JP | 2012519123 A | 8/2012 |
| JP | 2016529181 A | 9/2016 |
| JP | 2017178459 A | 10/2017 |
| JP | 2018530490 A | 10/2018 |
| WO | 2015019055 A1 | 2/2015 |

OTHER PUBLICATIONS

"International Search Report and Written Opinion of the International Searching Authority with English language translation", International Application No. PCT/CN2020/086000, Jul. 13, 2020, 17 pp.

"Notice of Reasons for Refusal and English language translation", JP Application No. 2022-510840, Jun. 3, 2024, 12 pp.

* cited by examiner

STORAGE SYSTEM

CROSS-REFERENCE TO RELATED APPLICATION

The present application is a U.S. National Stage Application under 35 U.S.C. § 371 of International Patent Application No. PCT/CN2020/086000, filed on Apr. 22, 2020, which is based on and claims priority to Chinese Patent Application No. 201910886446.1 and filed on Sep. 19, 2019, whose entire contents are incorporated herein by reference.

TECHNICAL FIELD

The present disclosure relates to the technical field of logistics, and in particular to a storage system.

BACKGROUND

In order to improve the space utilization rate and reduce the land occupation cost, the storage system is usually equipped with shelves with multi-layer article platforms, and uses article transport devices to access the articles.

In related technologies, the article transport device can only access the articles on the layer on which the article transport device is located, and it is difficult to access the articles on different layers. Usually, different article transport devices need to be provided on different layers.

SUMMARY OF THE INVENTION

The present disclosure provides a storage system, including: a storage device comprising a shelf, wherein the shelf include at least two layers of article platforms;
 an article transport device, configured to access articles on the article platforms; and
 a lifting drive mechanism disposed on the storage device and configured to have a power connection state with the article transport device to drive the article transport device to lift up or down along the shelf in the power connection state.

In some embodiments, the storage device includes at least one shelf unit, and the shelf unit includes two shelves between which a passage is arranged to enable the article transport device to pass through, the shelf includes at least two upright units arranged along a length direction of the passage, the upright unit includes two uprights arranged oppositely along a width direction of the passage to support the article platforms, a lifting position is formed between two adjacent uprights along the length direction on a side of the passage and two opposite uprights on the other side of the passage, and the article transport device is in the power connection state with the lifting drive mechanism at the lifting position and lifts up or down along the uprights at the lifting position under the driving effect of the lifting drive mechanism.

In some embodiments, there are at least two lifting positions, and the lifting drive mechanism is configured to drive the article transport device to lift up or down along the uprights at the lifting position when the article transport device moves to each lifting position.

In some embodiments, the lifting drive mechanism includes a first lifting drive mechanism and a second lifting drive mechanism, the first lifting drive mechanism includes lifting transmission units arranged on the uprights at the lifting positions to cooperate with the article transport device, and the second lifting drive mechanism is movably arranged on a top of the storage device and configured to have a power connection state and a power disconnection state with the lifting transmission unit.

In some embodiments, the second lifting drive mechanism includes a moving mechanism and a lifting power mechanism, the moving mechanism is movably arranged on the top of the storage device, the lifting power mechanism is arranged on the moving mechanism to move synchronously with the moving mechanism, and the lifting power mechanism and the lifting transmission unit are configured to have a power connection state and a power disconnection state.

In some embodiments, the lifting drive mechanism further includes a state switching mechanism, the state switching mechanism is configured to control the lifting power mechanism and the lifting transmission unit to switch between the power connection state and the power disconnection state.

In some embodiments, the state switching mechanism includes a lifting control mechanism, a first connection structure and a second connection structure, wherein the first connection structure is arranged on the lifting transmission units, the second connection structure is arranged on the lifting power mechanism, and the lifting control mechanism is configured to control engagement or disengagement of the first connection structure and the second connection structure by driving the second connection structure to move up or down, so as to control the lifting power mechanism and the lifting transmission unit to switch between the power connection state and the power disconnection state.

In some embodiments, one of the first connection structure and the second connection structure includes an internal spline and the other includes an external spline.

In some embodiments, the storage system further includes a guideway arranged on the top of the storage device, and the second lifting drive mechanism is configured to move along the guideway.

In some embodiments, the guideway includes a first guideway and a second guideway mutually crosswise arranged, the first guideway extends in the length direction of the passage, and the second guideway extends in the width direction of the passage.

In some embodiments, the article transport device includes an article transport device body and a cooperation mechanism arranged on the article transport device body, the lifting drive mechanism includes a lifting transmission unit that is arranged on the storage device to cooperate with the cooperation mechanism, and the article transport device and the lifting drive mechanism are in a power connection state when the cooperation mechanism is engaged with the lifting transmission unit.

In some embodiments, there is a power disconnection state between the lifting drive mechanism and the article transport device, and the storage system includes a state switching control mechanism, wherein the state switching control mechanism is configured to control engagement or disengagement of the cooperation mechanism and the lifting transmission unit, so as to control the article transport device and the lifting drive mechanism to switch between the power connection state and the power disconnection state.

In some embodiments, the state switching control mechanism is configured to control engagement or disengagement of the cooperation mechanism and the lifting transmission unit by controlling extension and retraction of the cooperation mechanism relative to the lifting transmission unit.

In some embodiments, the state switching control mechanism is arranged on the article transport device body, and the state switching control mechanism is configured to control extension and retraction of the cooperation mechanism relative to the lifting transmission unit by driving the cooperation mechanism to extend and retract relative to the article transport device body.

In some embodiments, the state switching control mechanism includes a telescopic power mechanism and a telescopic transmission mechanism, the telescopic power mechanism is connected with the cooperation mechanism through the telescopic transmission mechanism, and the telescopic transmission mechanism is configured to convert rotation of the telescopic power mechanism relative to the article transport device body into telescopic movement of the cooperation mechanism relative to the article transport device body.

In some embodiments, the telescopic transmission mechanism includes a ball screw mechanism, a screw rod of the ball screw mechanism is in drive connection to the telescopic power mechanism, and a screw nut of the ball screw mechanism is in drive connection to the cooperation mechanism.

In some embodiments, the lifting transmission unit includes four lifting transmission mechanisms respectively arranged on four uprights at a lifting position of the storage system, and the cooperation mechanism includes four cooperation units correspondingly cooperating with the four lifting transmission mechanisms.

In some embodiments, the cooperation unit engages with the lifting transmission mechanism.

In some embodiments, the cooperation unit includes a sprocket part, the lifting transmission mechanism includes a climbing chain mechanism, and the sprocket part engages with a climbing chain of the climbing chain mechanism.

In some embodiments, the lifting transmission unit includes two linkage mechanisms, one of the two linkage mechanisms is connected with two lifting transmission mechanisms in the lifting transmission unit to drive the two lifting transmission mechanisms connected herein to move synchronously, and the other of the two linkage mechanisms is connected with the other two lifting transmission mechanisms in the lifting transmission units to drive the two lifting transmission mechanisms connected herein to move synchronously.

In some embodiments, two linkage mechanisms correspond to two pairs of the lifting transmission mechanisms of the lifting transmission units that are positioned along the length direction of the passage, and the linkage mechanism is connected with two lifting transmission mechanisms of the lifting transmission units that are positioned along the width direction of the passage.

In some embodiments, the article transport device body is an automated guided vehicle.

By setting a lifting drive mechanism on the storage device to lift up or down the article transport device, the storage device can access the articles on different layers, which is beneficial to improve the utilization rate of space in the height direction of the storage system and fully utilize the height space of the storage system.

The exemplary embodiments of the present disclosure are described in detail with reference to the accompanying drawings, so that other features and advantages of the present disclosure will become apparent.

BRIEF DESCRIPTION OF THE DRAWINGS

In order to more clearly illustrate technical solutions in embodiments of the present disclosure or in the prior art, a brief introduction will be given below on accompanying drawings which need to be used in the description of the embodiments or the prior art. Apparently, the accompanying drawings described below are merely some embodiments of the present disclosure. Those skilled in the art can obtain other accompanying drawings according to these drawings without any creative effort.

DETAILED DESCRIPTION

Figure 1:
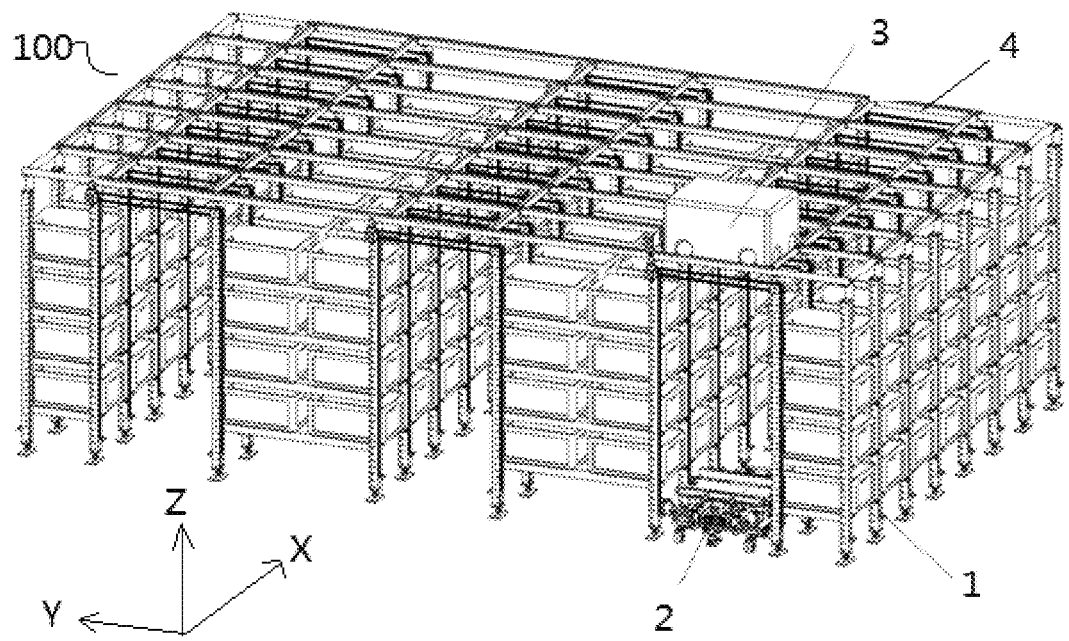
FIG. 1 is a schematic diagram of an overall structure of a storage system of an embodiment according to the present disclosure.

A clear and complete description will be given below on the technical solutions in the embodiments of the present disclosure in combination with the accompanying drawings in the embodiments of the present disclosure below, and apparently the embodiments described below are only a part but not all of the embodiments of the present disclosure. The description of at least one exemplary embodiment below is merely illustration, rather than serving as any limitation to the embodiments of the present disclosure and disclosures or uses thereof. Based upon the embodiments of the present disclosure, all the other embodiments which can occur to those skilled in the art without any inventive effort shall fall into the protection scope of the embodiments of the present disclosure.

The techniques, methods and devices known to those of ordinary skills in the art may not be discussed in detail, however, under appropriate conditions, the techniques, methods and devices should be deemed as a part of the description.

In the description of the present disclosure, it is necessary to understand that, the azimuth or positional relations indicated by terms "front", "rear", "up", "down", "left", "right", as well as "transverse", "longitudinal", "vertical", "horizontal", "top" and "bottom", are usually based on the azimuth or positional relations illustrated by the drawings, which is only for facilitating and simplifying description of the present disclosure, with no contrary description, these terms doesn't indicate or imply that the device or element referred thereto has to present a particular azimuth, or be constructed and operated in a particular azimuth, so that it cannot be understood as a limitation to the protection scope of the present disclosure. The terms "inside" and "outside" refer to the inside and outside relative to the profile of each component itself.

In the description of the embodiments of the present disclosure, it should be understood that, the defining of components and parts by such terms as "first" and "second" are merely for the convenience of distinguishing corresponding components and parts, unless otherwise stated, the above terms have no special meanings, therefore, such terms cannot be understood as a limitation to the protection scope of the embodiments of the present disclosure.

In addition, the technical features involved in different embodiments of the present disclosure described below can be combined mutually as long as they do not conflict with each other.

In related technologies, the article transport device can only access articles on a layer on which the article transport device is located, and it is difficult for the article transport device to access articles on different layers. Usually, different article transport devices need to be provided on different layers. This not only limits a space utilization rate in a height direction, but also causes such problems as equipment redundancy and lower articles access efficiency.

In order to improve the space utilization rate in the height direction of the storage system, the present disclosure provides a storage system 100.

FIGS. 1-8 show an embodiment of the storage system 100 in the present disclosure.

Referring to FIGS. 1-8, the storage system 100 provided by the present disclosure includes:
- a storage device 1 including a shelf 11, wherein the shelf 11 includes at least two layers of article platforms 112;
- an article transport device 2, configured to access articles a on the article platforms 112; and
- a lifting drive mechanism 3 disposed on the storage device 1 and configured to have a power connection state with the article transport device 2, and configured to have a power connection state with the article transport device 2 to drive the article transport device 2 to lift up or down along the shelf 11 in the power connection state.

Under the driving effect of the lifting drive mechanism 3, the article transport device 2 lifts up or down along the shelf 11 to access articles on different layers instead of being limited to access articles on a single layer, therefore, the space utilization rate in the height direction of the storage system 100 is effectively improved, and a height space of the storage system 100 is more fully utilized.

In addition, the same article transport device 2 can access the articles on different layers, therefore, the number of the article transport device 2 is reduced, the risk of equipment redundancy is reduced, and the article access efficiency is improved.

At the same time, compared with a case that the lifting drive mechanism 3 is independent of the storage device 1, when the lifting drive mechanism 3 is disposed on the storage device 1, it is more convenient for the lifting drive mechanism 3 to cooperate with the article transport device 2 to drive the article transport device 2 to lift up or down, in addition, a structure of the storage system 100 is more compact, and as the lifting drive mechanism 3 does not occupy additional ground space, a rental cost is reduced.

In some embodiments, the storage device 1 includes at least one shelf unit 1a, and the shelf unit 1a includes two shelves 11 between which a passage P is arranged to enable the article transport device 2 to pass through, the shelf 11 includes at least two upright units 1b arranged along a length directions X of the passage P, the upright unit 1b includes two uprights 111 arranged oppositely along a width directions Y of the passages P to support the article platforms 112, a lifting position b is formed between two adjacent uprights 111 along the length direction X on a side of the passages P and wo opposite uprights 111 on the other side of the passage P t.

In order to achieve a more intensive storage of the articles, there are at least two shelve units 1a in the storage device 1, so that the storage device 1 has at least two lifting positions b arranged along the width directions Y of the passages P, and/or, there are a plurality of upright units 1b, so that the storage device 1 has at least two lifting positions b arranged along the length directions X of the passages P.

In particular, there are a plurality of shelf units 1a and a plurality of upright units 1b, in this case, there are a plurality of lifting positions b, and these lifting positions b include both a plurality of lifting positions b arranged along the width direction Y of the passage P and a plurality of lifting positions b arranged along the length direction X of the passage P, such that a lifting position matrix with multiple rows and columns is formed, and the storage system 100 becomes a three-dimensional warehouse, which realized a higher-density storage of the articles with the same occupation space.

In the case that the lifting position b is provided, the article transport device 2 is in a power connection state with the lifting drive mechanism 3 at the lifting position b and lifts up or down along the uprights 111 at the lifting position b under the driving effect of the lifting drive mechanism 3, so that the article transport device 2 accesses the articles on various article layers at the lifting position b.

When there are at least two lifting positions b, the article transport device 2 is moveable between different lifting positions b, so as to access the articles a at different lifting positions b.

In order to enable the article transport device 2 to access the articles on a plurality of layers at each lifting position b, in some embodiments, the lifting drive mechanism 3 is configured to drive the article transport device 2 to lift up or down along the uprights 111 at each lifting position b when the article transport device 2 moves to each lifting position b. In this way, with a cooperation of the article transport device 2 and the lifting drive mechanism 3, the same article transport device 2 accesses the articles at different lifting positions b and on different layers at each lifting position b under the driving effect of the same lifting drive mechanism 3, which is particularly beneficial to further reduce the number of the article transport device 2 and the lifting drive mechanism 3 and the risk of equipment redundancy, and improve the article access efficiency.

Figure 2:
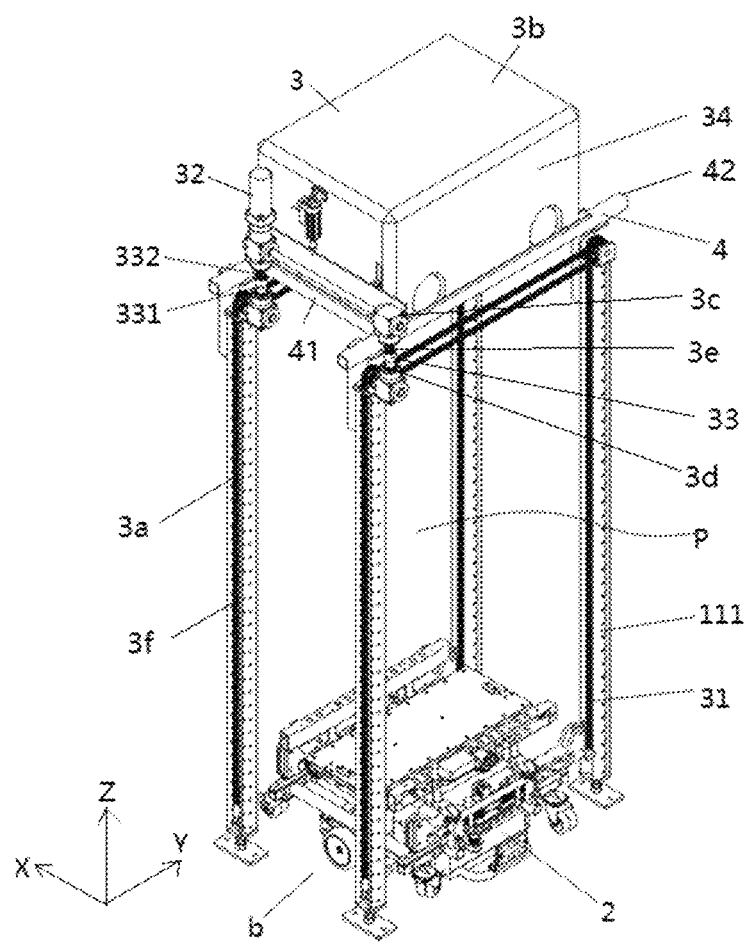
FIG. 2 is a schematic diagram of a cooperation structure of the lifting drive mechanism and the article transport device at one lifting position in FIG. 1.

In order to enable the lifting drive mechanism 3 to drive the article transport device 2 to lift up or down along the uprights 111 at the lifting position b when the article transport device 2 moves to each lifting position b, in some embodiments, as shown in FIGS. 1 and 2, the lifting drive mechanism 3 includes a first lifting drive mechanism 3a and a second lifting drive mechanism 3b, the first lifting drive mechanism 3a includes lifting transmission units 31 arranged on the uprights 111 at the lifting positions b cooperate with the article transport device 2, and the second lifting drive mechanism 3b is movably arranged on a top of the storage device 1 and configured to have a power connection state and a power disconnection state with the lifting transmission unit 31. In this way, when the article transport device 2 is at a specific lifting position b, the second lifting drive mechanism 3b also moves to the top of the corresponding lifting position b and is in power connection with the lifting transmission unit 31 at the corresponding lifting position b, and then drives the article transport device 2 to lift up or down among the layers at the lifting position b to access the articles as required; when the article transport device 2 accomplishes to access the articles at a specific lifting position b and needs to access the articles at another lifting position b, power connection between the second lifting drive mechanism 3b and the lifting transmission unit 31 is disconnected, and the second lifting drive mechanism 3b moves to the top of another lifting position b (which is referred to as the target lifting position) where the article transport device 2 needs to arrive, and further drives the article transport device 2 to lift up or down at the target lifting position when the article transport device 2 is transferred to the target lifting position.

The second lifting drive mechanism 3b includes a moving mechanism 34 and a lifting power mechanism 32, the moving mechanism 34 is movably arranged on the top of the storage device 1, the lifting power mechanism 32 is arranged on the moving mechanism 34 to move synchronously with the moving mechanism 34, and the lifting power mechanism 32 and the lifting transmission units 31 are configured to have a power connection state and a power disconnection state. In this way, the moving mechanism 34 drives the lifting power mechanism 32 to move to the tops of all the lifting positions b along the storage device 1, and the lifting power mechanism 32 is in power connection with the lifting transmission unit 31 after arriving at the lifting position b, so that the lifting power mechanism 32 drives the article transport device 2 to lift up or down at different layers of the lifting position b via the lifting transmission unit 31.

In order to automatically control the connection state between the lifting power mechanism 32 and the lifting transmission units 31, in some embodiments, the lifting drive mechanism 3 further includes a state switching mechanism 33 for controlling the lifting power mechanism 32 and the lifting transmission units 31 to switch between the power connection state and the power disconnection state, which is beneficial to speed up a running beat of the storage system 100 and improve the article access efficiency.

The state switching mechanism 33 includes a lifting control mechanism 3c, a first connection structure 3d and a second connection structure 3e, wherein the first connection structure 3d is arranged on the lifting transmission units 31, the second connection structure 3e is arranged on the lifting power mechanism 32, and the lifting control mechanism 3c is configured to control engagement or disengagement of the first connection structure 3d and the second connection structure 3e by driving the second connection structure 3e to move up or down, so as to control the lifting power mechanism 32 and the lifting transmission units 31 to switch between the power connection state and the power disconnection state. Based on this, as long as the lifting control mechanism 3c controls the second connection structure 3e to move up or down, the lifting power mechanism 32 and the lifting transmission units 31 are switched between the power connection state and the power disconnection state conveniently and efficiently.

In the present disclosure, the article transport device 2 includes an article transport device body 21 and a cooperation mechanism 22 arranged on the article transport device body 21, the cooperation mechanism 22 cooperates with the lifting transmission units 31 of the lifting drive mechanism 3 on the storage device 1, and when the cooperation mechanism 22 is engaged with the lifting transmission unit 31, the article transport device 2 and the lifting drive mechanism 3 are in the power connection state.

The article transport device body 21 is an article carrying device such as an AGV (Automated Guided Vehicle) 211 or a RGV (Rail Guided Vehicle).

The number of the lifting transmission units 31 is the same as the number of the lifting positions b, and the lifting transmission units 31 corresponds to the lifting positions b one by one. The lifting transmission unit 31 includes four lifting transmission mechanisms 31a respectively arranged on four uprights 111 at a lifting position b, and the cooperation mechanism 22 includes four cooperation units 22a correspondingly cooperating with the four lifting transmission mechanisms 31a. In this way, when the four cooperation units 22a are engaged with the four lifting transmission mechanisms 31a at each lifting position b, the article transport device 2 and the lifting drive mechanism 3 are in the power connection state, and the article transport device 2 lifts up or down smoothly.

In addition, the cooperation units 22a cooperate with the lifting transmission mechanisms 31a in diverse manners such as spliced connection, threaded connection, hooked connection, or engaged connection. When the engaged connection is adopted, the lifting transmission mechanisms 31a rotates to drive the engaged article transport device 2 to lift up or down.

In order to further improve a lifting stability of the article transport device 2, in some embodiments, the lifting transmission unit 31 further include two linkage mechanisms 31b, one of the two linkage mechanisms 31b is connected with two lifting transmission mechanisms 31a in the lifting transmission unit 31 to drive the two lifting transmission mechanism 31a connected herein to move synchronously, and the other of the two linkage mechanisms 31b is connected with the other two lifting transmission mechanisms 31a in the lifting transmission units 31 to drive the two lifting transmission mechanisms 31a connected herein to move synchronously. As with the effect of two linkage mechanisms 31b, four lifting transmission mechanisms 31a in the same lifting transmission units 31 synchronously move in pairs to drive four cooperation units 22a of the article transport device 2 to synchronously lift up or down in pairs, the article transport device 2 lifts up or down more stably, thereby reducing deflection or collision risks of the article transport device 2 in a lifting process.

Two lifting transmission mechanisms 31a connected by the linkage mechanisms 31b may be any two lifting drive mechanisms 31a in the same lifting transmission unit 31, for example, may be two lifting drive mechanisms 31a in the length direction X of the passage P at the lifting position b, or may be two lifting drive mechanisms 31a in the width direction Y of the passage P at the lifting position b, or may be two lifting drive mechanisms 31a on a diagonal line of the lifting position b.

In addition, in some embodiments, the lifting drive mechanism 3 and the article transport device 2 are configured to also have a power disconnection state, and the storage system 100 includes a state switching control mechanism 24. The state switching control mechanism 24 is configured to control engagement or disengagement of the cooperation mechanism 22 and the lifting transmission unit 31, so as to control the article transport device 2 and the lifting drive mechanism 3 to switch between the power connection state and the power disconnection state. In this way, when it is necessary to access the articles, the state switching control mechanism 24 controls the cooperation mechanism 22 to engage with the lifting transmission unit 31, so that the article transport device 2 lifts up or down to the target layer under the driving effect of the lifting drive mechanism 3, and when the article transport device 2 finishes transporting the articles at a specific lifting position b and needs to transport the articles at another lifting position b, the state switching control mechanism 24 controls the cooperation mechanism 22 to disengage from the lifting transmission unit 31, so that the article transport device 2 can freely move to the target lifting position instead of being limited by the lifting transmission unit 31. As can be seen, by setting the state switching control mechanism 24 to automatically control power connection between the article transport device 2 and the lifting drive mechanism 3, not only article handling tasks at each layer of the same lifting position b are smoothly completed, but also the article transport device 2 conveniently transfers between different lifting positions b to complete the good handling tasks at different lifting positions b, at the same time, a running beat of the entire storage system 100 is speeded up.

The state switching control mechanism 24 may control whether the cooperation mechanism 22 is engaged with the lifting transmission unit 31 in various ways. For example, the state switching control mechanism 24 is configured to drive the cooperation mechanism 22 and the lifting transmission unit 31 to rotate and/or extend or retract relative to each other, so as to control engagement or disengagement of the cooperation mechanism 22 and the lifting transmission unit 31.

The following gives a further description to the present disclosure in conjunction with the embodiment as shown in FIGS. 1-8.

As shown in FIGS. 1-8, in this embodiment, the storage system 100 is a three-dimensional warehouse and includes a storage device 1, an article transport device 2, a lifting drive mechanism 3, and a guide way 4.

The storage device 1 for storing articles a includes a plurality of shelf units 1a arranged side by side. Each of the shelf units 1a is provided with two shelves 11 arranged oppositely and spaced apart from each other, so that a passage P is formed between such the two shelves. Each of shelves 11 includes multiple layers of article platforms 112 and a plurality of upright units 1b arranged at intervals along the length direction X of the passage P. The upright unit 1b is configured to support the article platforms 112 and include two uprights 111 arranged at intervals in the width direction Y of the passage P. In this way, the storage device 1 is provided with a plurality of passages P, two shelves 11 at both sides of each passage P are separated by the multiple layers of article platforms 112 and a plurality of uprights 11 to form the article positions for storing the articles a, such that the storage device 1 can store a large amount of articles a.

Depending on various actual demands, the articles a in all article positions may be accessed. However, it is a difficulty about how to efficiently access the articles a at each article position.

In this embodiment, with a cooperation of the article transport device 2 and the lifting drive mechanism 3, the articles a at all the article positions are conveniently and efficiently accessed, and various logistics demands are flexibly met.

For convenience of description, as shown in FIGS. 1 and 2, a space between each two adjacent uprights 111 on side of the passage P and two corresponding uprights 111 on the other side of the passage P is referred to as a lifting position b below. It can be seen from FIG. 1 that the storage device 1 of this embodiment is provided with a plurality of lifting positions b arranged in a matrix.

In the embodiment, the article transport device 2 is configured to move along the passages P, so as to shift among different lifting positions b to meet the article handling demands at different lifting positions b. In addition, the article transport device 2 is also configured to lift up or down along the uprights 111 at the lifting positions b under the driving effect of the lifting drive mechanism 3, so as to meet the article handling demands of different layers at each lifting position b.

As shown in FIGS. 1-8, in the embodiment, the article transport device 2 includes an article transport device body 21 of an automated guided vehicle 211 and a cooperation mechanism 22 arranged on the article transport device body 21, and the lifting drive mechanism 3 includes a first lifting drive mechanism 3a with a plurality of lifting transmission units 31 at the lifting positions b, and a second lifting drive mechanism 3b with a moving mechanism 34 on the top of the storage device 1, a lifting power mechanism 32 and a state switching mechanism 33, where the lifting power mechanism 32 and the state switching mechanism 33 are arranged on the moving mechanism 34.

The moving mechanism 34 drives the lifting power mechanism 32 to move together among different lifting positions b; the lifting power mechanism 32 and the lifting transmission units 31 are switched between the power connection state and the power disconnection state under the control of the state switching mechanism 33, and the lifting power mechanism 32 provides power to the lifting transmission units 31 in the power connection state; the cooperation mechanism 22 is engaged or disengaged with the lifting transmission units 31 under the control of the state switching control mechanism 24, such that the article transport device 2 and the lifting drive mechanism 3 are switched between the power connection state and the power disconnection state.

When it is necessary to access the articles a at different layers at the lifting position b, the article transport device 2 moves to the lifting position b, and the state switching control mechanism 24 controls the cooperation mechanism 22 to engage with and the lifting transmission unit 31, at the same time, the moving mechanism 34 drives the lifting power mechanism 32 to move to the top of the corresponding lifting position b, and the state switching mechanism 33 controls the lifting power mechanism 32 to engage with the lifting transmission unit 31, such that the lifting power mechanism 32 drives the cooperation mechanism 32 to lift up or down through the lifting transmission unit 31, thereby controlling the article transport device 2 to lift up or down to different layers at each lifting position b to perform the article handling tasks at different layers.

When the article handling tasks at a specific lifting position b are completed and those at another lifting position b need to be performed, the lifting drive mechanism 3 drives the article transport device 2 to descend to the ground, and the state switching control mechanism 24 controls the cooperation mechanism 22 to disengage from the lifting transmission unit 31, such that the article transport device 2 and the lifting power mechanism 3 are switched into the power disconnection state, and the article transport device 2 can move along the passage P to another lifting position b, at the same time, the state switching mechanism 33 controls the lifting power mechanism 32 to disengage from the lifting transmission unit 31, so that the lifting power mechanism 32 and the lifting transmission units 31 are switched into the power disconnection state, and the lifting power mechanism 32 can move to the top of another lifting position b under the driving effect of the moving mechanism 34, so as to wait for driving the article transport device 2 again.

As shown in FIG. 2 and FIGS. 5-7, each of the lifting transmission units 31 of this embodiment includes four lifting transmission mechanisms 31a respectively arranged on four uprights 111 at the lifting position b, and the cooperation mechanism 22 of the article transport device 2 includes four cooperation units correspondingly cooperating with the four lifting transmission mechanisms 31a of the same lifting transmission unit 31.

Figure 7:
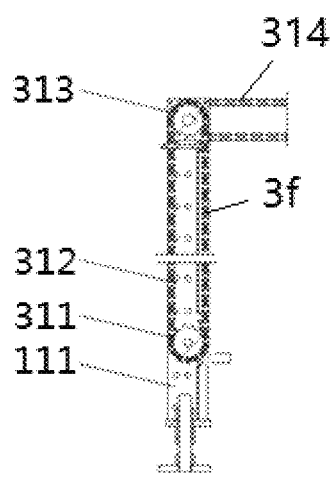
FIG. 7 is a schematic structural diagram of the lifting transmission mechanism in FIG. 6.

Specifically, as can be seen from FIG. 7, every lifting transmission mechanism 31a includes a climbing chain mechanism 3f with a first sprocket 311, a second sprocket 313 and a climbing chain 312, wherein the first sprocket 311 and the second sprocket 313 are respectively arranged at the lower parts of the uprights 111 and the upper parts thereof, the second sprocket 313 is in drive connection with the lifting power mechanism 32 through the linkage mechanism 31b, and the climbing chain 312 is connected onto the first sprocket 311 and the second sprocket 313. Based on this, the second sprocket 313 is a drive sprocket and the first sprocket 311 is a driven sprocket. When the lifting power mechanism 32 is engaged with the linkage mechanism 31b under the control of the state switching mechanism 33, the climbing chain 312 rotates under the driving effect of the lifting power mechanism 32, thereby driving the article transport device 22 engaged with such climbing chain to lift up or down along the uprights 111 at the lifting position b.

Figure 3:
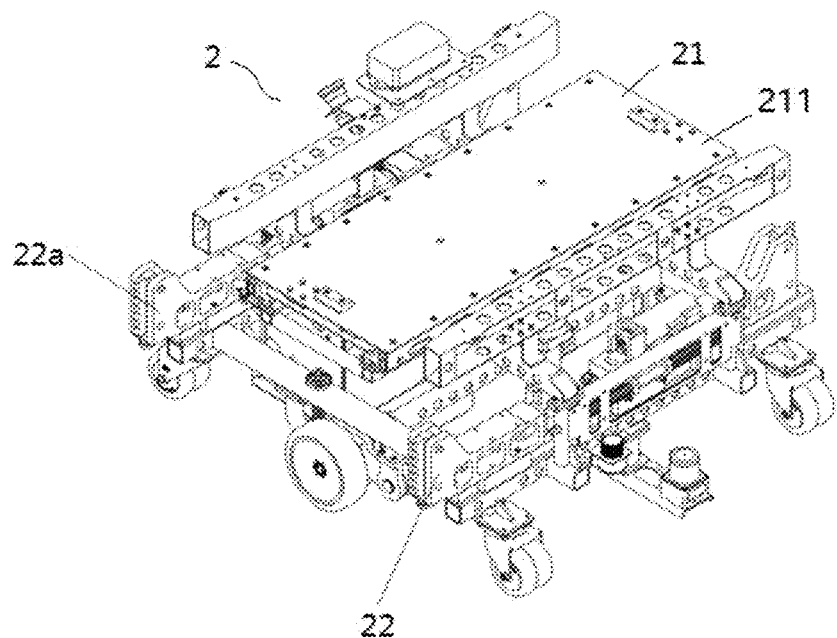
FIG. 3 is a schematic diagram of a three-dimensional structure of the article transport device in FIG. 2.
Figure 4:
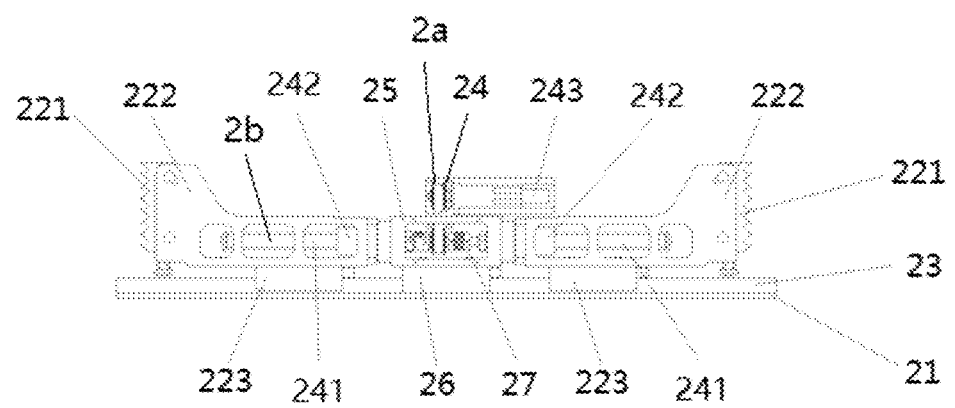
FIG. 4 is a schematic structural diagram of the state switching control mechanism and the cooperation mechanism in FIG. 3.

It can be seen from FIGS. 3 and 4 that four cooperation units 22a are arranged in pairs on opposite sides of the article transport device body 21, two cooperation units 22a located on the same side of the article transport device body 21 are arranged in opposite directions to each other, and all the cooperation units 22a are slidably arranged relative to the article transport device body 21, so as to extend or retract relative to the article transport device body 21 under the control of the state switching control mechanism 24, thereby achieving engagement or disengagement of the cooperation units 22a and the corresponding lifting transmission mechanisms 31a, so as to control the article transport device 2 and the lifting drive mechanism 3 to switch between the power connection state and the power disconnection state.

As can be seen from FIG. 4, in the embodiment, each of the cooperation units 22a includes a sprocket part 221, a sprocket mounting base 222 and a slider 223; the sprocket part 221 is installed on the mounting base 222, and the mounting base 222 is installed on the slider 223, moreover, the article transport device body 21 is provided with a sliding rail 23, and the slider 223 is slidably arranged on the sliding rail 23 and in drive connection with the state switching control mechanism 24. In this way, the cooperation units 22a slides relative to the article transport device body 21 under the driving effect of the state switching control mechanism 24, so that the sprocket part 221 extends or retracts relative to the article transport device body 21, when the sprocket part 221 extends to engage with the climbing chain 312, the cooperation unit 22a is engage d with the corresponding lifting transmission mechanism 31a, and the article transport device 2 and the lifting drive mechanism 3 are in the power connection state, and when the sprocket part 221 retracts, the cooperation unit 22a is disengaged from the corresponding lifting transmission mechanism 31a, and the article transport device 2 and the lifting drive mechanism 3 are in the power disconnection state.

In order to conveniently control engagement or disengagement of the cooperation mechanism 22 and the lifting transmission unit 31, as shown in FIGS. 3 and 4, in the embodiment, the state switching control mechanism 24 is arranged on the article transport device body 21, and includes a telescopic power mechanism 2a and a telescopic transmission mechanism 2b, the telescopic power mechanism 2a is connected with the cooperation mechanism 22 through the telescopic transmission mechanism 2b, and the telescopic transmission mechanism 2b is configured to converts rotation of the telescopic power mechanism 2a relative to the article transport device body 21 into telescopic movement of the cooperation mechanism 22 relative to the article transport device body 21.

Specifically, in combination with FIGS. 3 and 4, in the embodiment, the telescopic power mechanism 2a includes a first motor 243, and the telescopic transmission mechanism 2b includes a ball screw mechanism, wherein a screw rod 241 of the ball screw mechanism is in drive connection with the first motor 243 of the telescopic power mechanism 2a, and a screw nut 242 of the ball screw mechanism is in drive connection with the cooperation mechanism 22. The screw rod 241 and the screw nut 242 rotates in the same direction. The screw rod 241 is mounted on a screw mounting base 25 through bearings, locking nuts and the like, and the screw mounting base 25 is mounted on the article transport device body 21 through a base 26. In this way, under the action of the ball screw mechanism, when the first motor 243 rotates, the cooperation mechanism 22 extends or retracts relative to the article transport device body 21, so as to engage or disengage with the lifting transmission unit 31.

Furthermore, in order to cooperate with four cooperation units 22a of the cooperation mechanism 22, in the embodiment, the state switching control mechanism 24 includes two combined structures (hereinafter referred to as telescopic control mechanisms for short) including the telescopic power mechanism 2a and the telescopic transmission mechanism 2b, wherein the two telescopic control mechanisms are respectively in drive connection with two pairs of cooperation units 21a located on opposite sides of the article transport device body 21, the telescopic control mechanisms are respectively provided with two ball screw mechanisms, two respective ball screw rods in the same telescopic control mechanism are respectively in drive connection with two cooperation units 21a located on the same side of the article transport device body 21, and the screw rods 241 of two ball screw mechanisms in the same telescopic control mechanism have an opposite rotation direction and are connected through a shaft coupling 27. Based on this, in each of the telescopic control mechanisms, the rotation of the first motor 243 drives the screw rods 241 of two ball screw mechanisms to rotate, so that two screw nuts 242 drives two corresponding cooperation units 21a to conduct telescopic movement synchronously, and then under the control of two telescopic control mechanisms, four cooperation units 21a conduct telescopic movement synchronously to be synchronously engaged or disengaged with four lifting transmission mechanisms 31a, thereby realizing a reliable control of a connection relationship between the article transport device 2 and the lifting drive mechanism 3.

Figure 5:
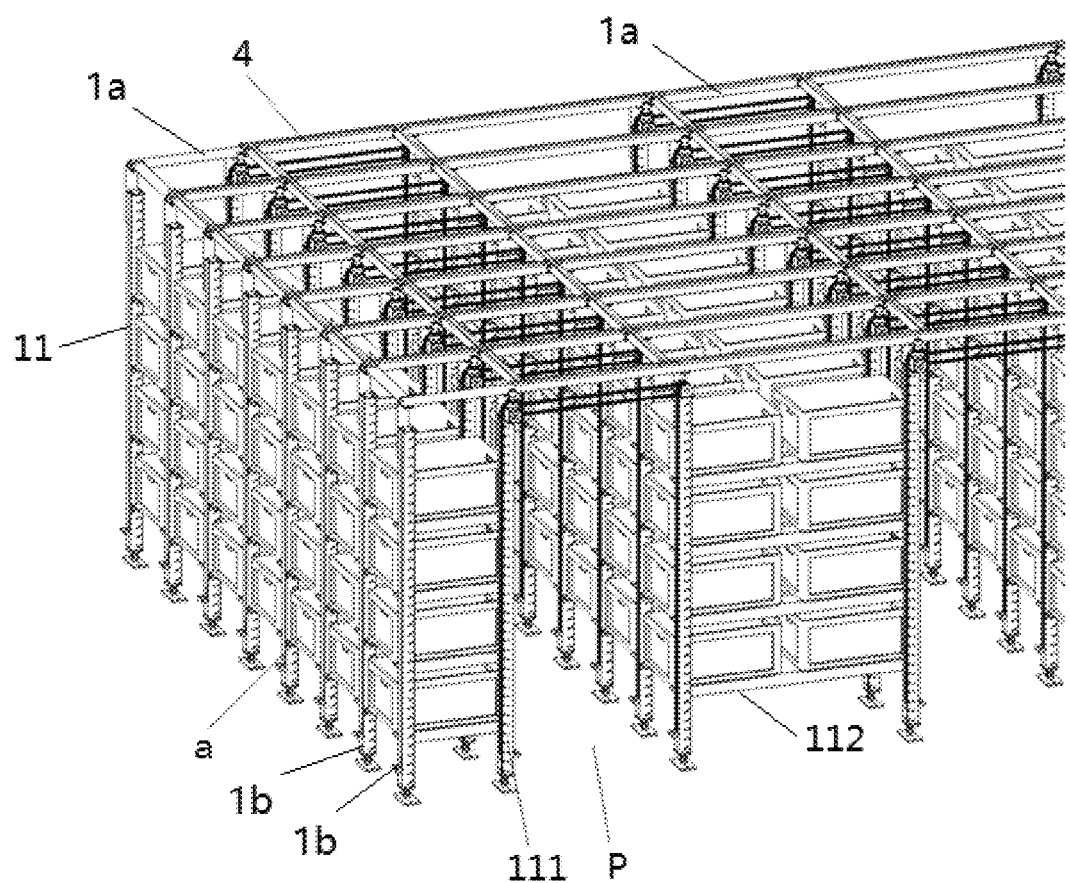
FIG. 5 is a schematic structural diagram of the storage device in FIG. 1.
Figure 6:
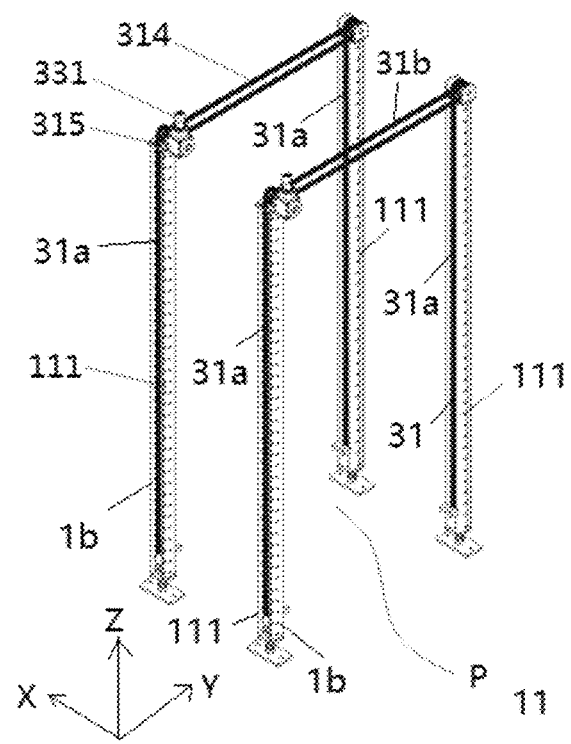
FIG. 6 is a schematic diagram of a three-dimensional structure of one lifting position and the corresponding lifting transmission unit thereof in FIG. 5.

In addition, as shown in FIGS. 2, 5 and 6, the lifting transmission unit 31 of the embodiment further includes two linkage mechanisms 31b, the two linkage mechanisms 31b are corresponding to two pairs of the lifting transmission mechanisms 31a of the lifting transmission units 31 that are positioned along the length direction X of the passage P, and each of the linkage mechanism is connected with two lifting transmission mechanisms 31a that are positioned at the lifting position b and in the width direction Y of the passage P. In this way, two lifting transmission mechanisms 31a that are of the same lifting transmission units and positioned at opposite sides of the passage P are driven by the same linkage mechanism 31b, and two linkage mechanisms 31b in the same lifting transmission units 31 are both driven by the same lifting power mechanism 32, therefore, four lifting transmission units 31a in the same lifting transmission units 31 have better movement synchronization, and the linkage mechanisms 31b are more conveniently arranged.

In order to synchronously drive two opposite lifting transmission mechanisms 31a positioned on two sides of the passages P, as shown in FIGS. 6 and 7, in the embodiment, every linkage mechanism 31b includes a transmission chain 314 and a first speed reducer 315, wherein the transmission chain 314 are connected with the second sprockets 313 on two opposite uprights 111 that are positioned at the lifting positions b and on both sides of the passage P, and the first reducer 315 is connected with the transmission chain 314 and in drive connection with the lifting power mechanism 32 through the state switching mechanism 33. In this way, when the state switching mechanism 33 controls the lifting power mechanisms 32 to engage with the first reducer 315, the first reducer 315 drives two opposite lifting transmission mechanisms 31a positioned on both sides of the passage P to rotate synchronously through the transmission chain 314 under the driving effect of the lifting power mechanism 32. As two first reducers 315 are both driven by the same lifting power mechanism 32, four lifting transmission mechanisms 31a in the lifting transmission unit 31 rotates synchronously, so as to lift up or down the article transport device 2 more smoothly.

Figure 8:
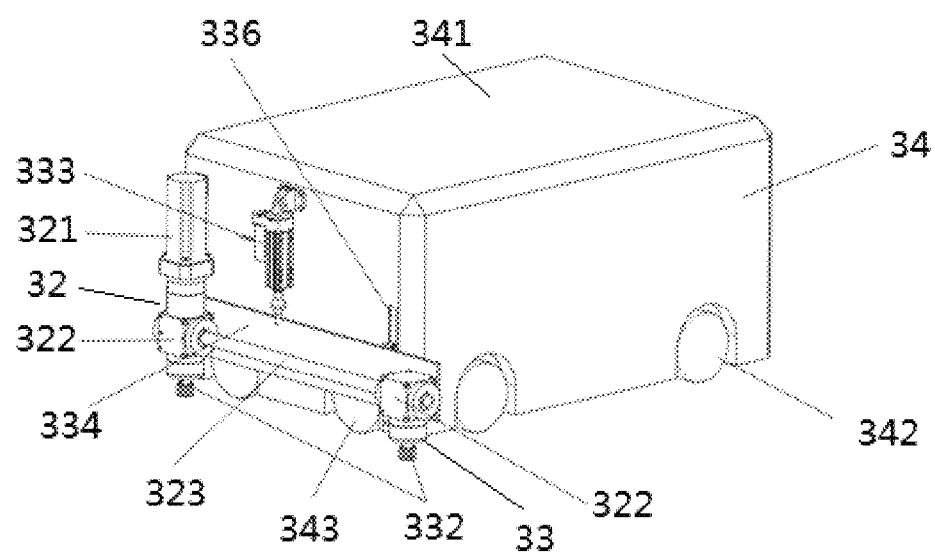
FIG. 8 is a schematic structural diagram of the moving mechanism, lifting power mechanism and state switching mechanism in FIG. 2.

As shown in FIG. 8, in this embodiment, the lifting power mechanism 32 includes a second motor 321 and a second speed reducer 322, and the second motor 321 is connected with the state switching mechanism 33 through the second speed reducer 322, so that under the control of the state switching mechanism 33, power of the second motor 321 is transmitted to the lifting transmission unit 31 through the second speed reducer 322 and the state switching mechanism 33, so as to drive the lifting transmission units 31 to rotate, and then drive the article transport device 2 engaged with the lifting transmission units 31 to lift up or down.

Furthermore, it can be seen from FIG. 8 that, in this embodiment, the lifting power mechanism 32 is provided with two second speed reducers 322 which are corresponding to two first speed reducers 315 in two linkage mechanisms 31b, and the two second speed reducers 322 are connected with each other through a transmission shaft 323, so as to conveniently drive two linkage mechanisms 31b of the lifting transmission unit 31 with the same second motor 321 and improve the lifting stability. In this way, when rotating, the second motors 321 drives two linkage mechanisms 31b in the lifting transmission units 31 through two second speed reducers 322, so as to synchronously drive four lifting transmission mechanisms 31a in the lifting transmission units 31 to rotate.

In addition, as shown in FIGS. 2, 6 and 8, the state switching mechanism 33 of this embodiment includes a lifting control mechanism 3c, a first connection structure 3d, and a second connection structure 3e, wherein the lifting control mechanism 3c includes an electric cylinder 333, a lifting base plate 334 and a lifting guide rail 336, the first connection structure 3d includes an internal spline 331, and the second connection structure 3e includes an external spline 332.

The electric cylinder 333 and the lifting guide rail 336 are both arranged on the moving mechanism 34, the lifting base plate 334 is slidably arranged on the lifting guide rail 336, and the lifting power mechanism 32 is installed on the lifting base plate 334, so that the electric cylinder 333 drives the lifting power mechanism 32 to lift up or down by driving the lifting base plate 334 to slide along the lifting guide rail 336.

The external spline 332 is arranged on the lifting power mechanism 32, and the internal spline 331 is arranged on the lifting transmission unit 31, therefore, the lifting power mechanism 32 drives the external spline 332 to lift up or down relative to the internal spline 331 when driven by the electric cylinder 333 to lift up or down, thereby controlling engagement or disengagement of the external spline 332 and the internal spline 332 and whether the lifting power mechanism 32 is in power connection with the lifting transmission unit 31, such that the lifting power mechanism 32 and the lifting transmission unit 31 are switched between the power connection state and the power disconnection state.

Specifically, the external spline 332 is arranged on the second speed reducer 322, and there are two external splines, which corresponds to the number of the second reducers 322. The internal spline 331 is arranged on the first reducer 315, and there are two internal splines, which corresponds to the number of the first speed reducers 322.

It can be understood that, as a replacement, the arrangement positions of the external spline 332 and internal spline 331 are mutually replaceable, that is, the external spline 332 may be arranged on the lifting transmission unit 31, and the internal spline 331 may be arranged on the lifting power mechanism 32, in this case, the first connection structure 3d includes the external spline 332 and the second connection structure 3e includes the internal spline 331.

As shown in FIGS. 2 and 8, in this embodiment, to conveniently move the moving mechanism 34, a guideway 4 is arranged on the top of the storage device 1, and the guideway 4 includes a first guideway 41 and a second guideway 42 mutually crosswise arranged, wherein the first guideway 41 extends in the length direction X of the passage P, and the second guideway 42 extends in the width direction Y of the passage P. Meanwhile, the moving mechanism 34 is configured as a power vehicle and includes a moving body 341, a first wheel group 342 and second wheel group 343, the first wheel group 342 and the second wheel group 343 are both arranged on the moving body 341, and central axes of the first wheel group 342 and second wheel group 343 are respectively along the length direction X and the width direction Y of the passage P. Based on this, the moving mechanism 34 moves along the width direction Y of the passage P through cooperation of the first wheel group 342 and the second guideway 42, and moves along the length direction X of the passage P through cooperation of the second wheel group 343 and the first guideway 41, so that the moving mechanism 34 drives the lifting power mechanism 32 to move flexibly among the lifting positions b.

The working process of the storage device 100 in this embodiment is as follows:

after receiving a command to access the articles a at a specific article position, the article transport device 2 moves on the ground to the corresponding lifting position b, and the moving mechanism 34 moves to the top of the lifting position b along the guideway 4;

when the article transport device 2 arrives at the lifting position b, two first motors 243 on the article transport device 2 drive four sprocket parts 221 to extend out to respectively engage with four climbing chains 312 on four uprights 111 at the lifting position b, and at this time, the electric cylinder 333 on the moving mechanism 34 operates to push the lifting base plate 334 to lift up or down, so that the second reducers 322 on the lifting base plate 334 and the external splines 332 on the second reducers 322 descend to insert into the internal splines 331 installed at input ends of the first reducers 315, and the lifting power mechanism 32 is in power connection with the lifting transmission unit 31; then, the second motor rotates to drive to rotate around the first sprocket 311 and the second sprocket 313, so that the article transport device 2 is pulled by the climbing chain 312 to climb up on the shelf 11;

when the article transport device 2 climbs up to the layers where the articles a are located, the article access mechanism on the article transport device body 21 of the article transport device 2 operates to put the articles a on the article transport device body 21 into the article position of the shelf or take the articles a at the article position of the shelf to the article transport device body 21, so as to complete the article access tasks, whereafter, the second motor 321 on the moving mechanism 34 rotates reversely to drive the climbing chain 312 to rotate reversely around the sprockets, so that article transport device 2 is pushed by the climbing chains 312 to descend to the ground, at this time, two first motors 243 on the article transport device 2 rotate reversely to drive four sprocket parts 221 to retract, so that the sprocket parts 221 are disengaged from the climbing chain 312, then the article transport device 2 moves on the ground as needed, for an example, moves to a next station (for example, sorting station) to complete circulation of articles among different stations, or moves to another lifting position b to complete article handling tasks thereon.

It can be seen that the storage system 100 of this embodiment can make full use of the three-dimensional space of the warehouse, thereby achieving high-density storage, high-efficiency access and cost reduction.

The foregoing embodiments are merely exemplary embodiments of the present disclosure, but are not intended to limit the present disclosure. Any modification, equivalent replacement, improvement, etc. made without departing from the principles of the present disclosure should also fall within the protection scope of the claims of the present disclosure.

The invention claimed is:

1. A storage system, comprising:
a storage device comprising a shelf, wherein the shelf comprises at least two layers of article platforms;
an article transport device, configured to access articles on the article platforms; and
a lifting drive mechanism disposed on the storage device and configured to have a power connection state with the article transport device to drive the article transport device to lift up or down along the shelf in the power connection state;
wherein the storage device comprises at least one shelf unit, and the shelf unit comprises two shelves between which a passage is arranged to enable the article transport device to pass through, the shelf comprises at least two upright units arranged along a length direction of the passage, the upright unit comprises two uprights arranged oppositely along a width direction of the passage to support the article platforms, a lifting position is formed between two adjacent uprights along the length direction on a side of the passage and two opposite uprights on an opposite side of the passage, and the article transport device is in the power connection state with the lifting drive mechanism at the lifting position and lifts up or down along the uprights at the lifting position under the driving effect of the lifting drive mechanism;
wherein there are at least two lifting positions, and the lifting drive mechanism is configured to drive the article transport device to lift up or down along the uprights at the lifting position when the article transport device moves to each lifting position;
wherein the lifting drive mechanism comprises a first lifting drive mechanism and a second lifting drive mechanism, the first lifting drive mechanism comprises lifting transmission units arranged on the uprights at the lifting positions to cooperate with the article transport device, and the second lifting drive mechanism is movably arranged on a top of the storage device and configured to have a power connection state and a power disconnection state with the lifting transmission unit.

2. The storage system according to claim 1, wherein the second lifting drive mechanism comprises a moving mechanism and a lifting power mechanism, the moving mechanism is movably arranged on the top of the storage device, the lifting power mechanism is arranged on the moving mechanism to move synchronously with the moving mechanism, and the lifting power mechanism and the lifting transmission unit are configured to have a power connection state and a power disconnection state.

3. The storage system according to claim 2, wherein the lifting drive mechanism further comprises a state switching mechanism, the state switching mechanism is configured to control the lifting power mechanism and the lifting transmission unit to switch between the power connection state and the power disconnection state.

4. The storage system according to claim 3, wherein the state switching mechanism comprises a lifting control mechanism, a first connection structure and a second connection structure, wherein the first connection structure is arranged on the lifting transmission units, the second connection structure is arranged on the lifting power mechanism, and the lifting control mechanism is configured to control engagement or disengagement of the first connection structure and the second connection structure by driving the second connection structure to move up or down, so as to control the lifting power mechanism and the lifting transmission unit to switch between the power connection state and the power disconnection state.

5. The storage system according to claim 4, wherein one of the first connection structure and the second connection structure comprises an internal spline and the other comprises an external spline.

6. The storage system according to claim 1, further comprising a guideway arranged on the top of the storage device, and the second lifting drive mechanism is configured to move along the guideway.

7. The storage system according claim 1, wherein the article transport device comprises an article transport device body and a cooperation mechanism arranged on the article transport device body, the lifting drive mechanism comprises a lifting transmission unit that is arranged on the storage device to cooperate with the cooperation mechanism, and the article transport device and the lifting drive mechanism are in a power connection state when the cooperation mechanism is engaged with the lifting transmission unit.

8. The storage system according to claim 7, wherein there is a power disconnection state between the lifting drive mechanism and the article transport device, and the storage system comprises a state switching control mechanism, wherein the state switching control mechanism is configured to control engagement or disengagement of the cooperation mechanism and the lifting transmission unit, so as to control the article transport device and the lifting drive mechanism to switch between the power connection state and the power disconnection state.

9. The storage system according to claim 8, wherein the state switching control mechanism is configured to control engagement or disengagement of the cooperation mechanism and the lifting transmission unit by controlling extension and retraction of the cooperation mechanism relative to the lifting transmission unit.

10. The storage system according to claim 9, wherein the state switching control mechanism is arranged on the article transport device body, and the state switching control mechanism is configured to control extension and retraction of the cooperation mechanism relative to the lifting transmission unit by driving the cooperation mechanism to extend and retract relative to the article transport device body.

11. The storage system according to claim 10, wherein the state switching control mechanism comprises a telescopic power mechanism and a telescopic transmission mechanism, the telescopic power mechanism is connected with the cooperation mechanism through the telescopic transmission mechanism, and the telescopic transmission mechanism is configured to convert rotation of the telescopic power mechanism relative to the article transport device body into telescopic movement of the cooperation mechanism relative to the article transport device body.

12. The storage system according to claim 11, wherein the telescopic transmission mechanism comprises a ball screw mechanism, a screw rod of the ball screw mechanism is in drive connection to the telescopic power mechanism, and a screw nut of the ball screw mechanism is in drive connection to the cooperation mechanism.

13. The storage system according to claim 7, wherein the lifting transmission unit comprises four lifting transmission mechanisms respectively arranged on four uprights at a lifting position of the storage system, and the cooperation mechanism comprises four cooperation units correspondingly cooperating with the four lifting transmission mechanisms.

14. The storage system according to claim 13, wherein the cooperation unit engages with the lifting transmission mechanism.

15. The storage system according to claim 13, wherein the lifting transmission unit comprises two linkage mechanisms, one of the two linkage mechanisms is connected with two lifting transmission mechanisms in the lifting transmission unit to drive the two lifting transmission mechanisms connected herein to move synchronously, and the other of the two linkage mechanisms is connected with the other two lifting transmission mechanisms in the lifting transmission units to drive the two lifting transmission mechanisms connected herein to move synchronously.

16. The storage system according to claim 15, wherein two linkage mechanisms correspond to two pairs of the lifting transmission mechanisms of the lifting transmission units that are positioned along the length direction of the passage, and the linkage mechanism is connected with two lifting transmission mechanisms of the lifting transmission units that are positioned along the width direction of the passage.

17. The storage system according to claim 7, wherein the article transport device body is an automated guided vehicle.

* * * * *